(12) United States Patent
Fuechtner

(10) Patent No.: US 8,608,615 B2
(45) Date of Patent: Dec. 17, 2013

(54) DRIVE SYSTEM, IN PARTICULAR FOR A MOTOR VEHICLE

(75) Inventor: Martin Fuechtner, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 477 days.

(21) Appl. No.: 13/020,348

(22) Filed: Feb. 3, 2011

(65) Prior Publication Data

US 2011/0198139 A1 Aug. 18, 2011

(30) Foreign Application Priority Data

Feb. 15, 2010 (DE) .......................... 10 2010 008 754

(51) Int. Cl.
*B60K 1/02* (2006.01)
*F16H 3/08* (2006.01)
(52) U.S. Cl.
USPC ................................................ 477/3; 74/330
(58) Field of Classification Search
USPC ........................................................ 477/3, 5
See application file for complete search history.

(56) References Cited

U.S. PATENT DOCUMENTS

| | | | |
|---|---|---|---|
| 6,506,139 B2 | 1/2003 | Hirt et al. | |
| 6,634,247 B2 | 10/2003 | Pels et al. | |
| 6,712,734 B1 | 3/2004 | Loeffler | |
| 6,887,180 B2 | 5/2005 | Pels et al. | |
| 7,540,823 B2 * | 6/2009 | Kilian et al. | 477/3 |

FOREIGN PATENT DOCUMENTS

DE 19950679 A1 4/2001

* cited by examiner

*Primary Examiner* — Edwin A Young
(74) *Attorney, Agent, or Firm* — Gerald E. Hespos; Michael J. Porco; Matthew T. Hespos

(57) ABSTRACT

A drive system has a dual clutch transmission with two component transmissions, a dual clutch and an output shaft. The two component transmissions have a common main shaft and each has one component transmission input shaft that can be connected operatively to the main shaft. The main shaft and the output shaft are connected operatively to one another. A combustion engine selectively can be connected operatively to one of the component transmissions via the dual clutch and one of the component transmission input shafts to drive the output shaft via the main shaft. An electric machine can be connected positively and operatively to one of the component transmission input shafts and/or to the output shaft, or can be connected positively and operatively to one of the component transmission input shafts and/or to the main shaft.

9 Claims, 10 Drawing Sheets

DRIVE SYSTEM, IN PARTICULAR FOR A MOTOR VEHICLE

CROSS-REFERENCE TO RELATED APPLICATION

This application claims priority under 35 USC 119 to German Patent Appl. No. 10 2010 008 754.8, filed on Feb. 15, 2010, the entire disclosure of which is incorporated herein by reference.

BACKGROUND OF THE INVENTION

1. Field of the Invention

The invention relates to a drive system for a motor vehicle.

2. Description of the Related Art

The problems underlying the invention apply to any vehicle but are explained in detail with reference to a passenger car.

A hybrid vehicle generally refers to a vehicle with a drive system that has a number of drive units, such as a combustion engine and an electric motor. Parallel hybrid drives generally are used in hybrid vehicles to produce as high an energy efficiency as possible by allowing the electric motor and the combustion engine to introduce torque into a transmission either as alternatives or cumulatively. Moreover, it should also be possible to use the electric motor as a generator. For example, braking energy of the vehicle is a form of kinetic energy, and desirably should be used to charge electrical energy storage devices. Frequent starting and acceleration processes of the kind that generally occur in urban traffic, for example, preferably are carried out or assisted by the electric motor in the case of a hybrid motor vehicle since operating the combustion engine with frequent changes in load results in increased fuel consumption and pollutant emissions. In contrast to combustion engines, electric motors have a high torque virtually from a standstill, even at low motor speeds, and the electric motor therefore almost is predestined for starting and acceleration processes. A combustion engine, on the other hand, can only be operated with a high efficiency at its rated speed, e.g. when the vehicle is driven at a constant high speed. To enable the advantages of the combustion engine to be combined with the advantages of the electric motor, it is therefore necessary to design the drive system in such a way that both the power of the combustion engine and the power of the electric motor can be coupled into the drive system.

A drive system for a motor vehicle with a shift transmission, a combustion engine and an electric machine is described in U.S. Pat. No. 6,506,139 B2. The combustion engine can be connected nonpositively to the input shaft of the transmission via a friction clutch to drive an output shaft of the transmission. The electric machine can be connected to the output shaft or the input shaft via further friction clutches or positive clutches. In this arrangement, the electric machine is used to start the combustion engine, to generate electrical energy and essentially to smooth out interruptions in tractive effort that occur as the transmission is shifted due to the necessary decoupling of the combustion engine from the drive train.

It is therefore the underlying object of the present invention to provide an improved drive system.

SUMMARY OF THE INVENTION

The invention relates to a drive system for a motor vehicle having a dual clutch transmission with two component transmissions, a dual clutch and an output shaft. The two component transmissions comprise a common main shaft and in each case one component transmission input shaft. Each component transmission input shaft is connected operatively to the main shaft, and the main shaft and the output shaft are connected operatively to one another. The drive system also has a combustion engine that selectively can be connected operatively to one of the component transmissions via the dual clutch and one of the component transmission input shafts to drive the output shaft via the main shaft. The drive system further comprises an electric machine that can be connected positively and operatively to one of the component transmission input shafts and/or to the output shaft, or which can be connected positively and operatively to one of the component transmission input shafts and/or to the main shaft.

The invention also relates to a drive system for a motor vehicle having a dual clutch transmission with two component transmissions, a dual clutch and an output shaft. The two component transmissions comprise a common main shaft and in each case one component transmission input shaft that can each be connected operatively to the main shaft. The main shaft and the output shaft are connected operatively to one another. The drive system further has a combustion engine that can be selectively operatively connected to one of the component transmissions via the dual clutch and one of the component transmission input shafts to drive the output shaft via the main shaft. The drive system further has an electric machine that is positively operatively connected to one of the component transmission input shafts and can be nonpositively operatively connected to the output shaft.

The invention further relates to drive system for a motor vehicle with an automated shift transmission that has an input shaft, a main shaft, a clutch and an output shaft. The input shaft can be connected operatively to the main shaft, and the main shaft and the output shaft are connected operatively to one another. The drive system also has a combustion engine that can be connected operatively to the input shaft via the clutch to drive the output shaft via the main shaft. The drive system further has an electric machine that can be operatively connected to the input shaft.

The above described embodiments of the invention connect the electric machine directly to the combustion engine and/or the output shaft of the transmission. This direct connection of the electric machine and/or the output shaft of the transmission to the combustion engine advantageously results in optimized efficiency with minimum gear meshing.

The drive system preferably has one electric machine gearwheel pair with a clutch element for positive operative connection of the electric machine to one of the component transmission input shafts and/or to the output shaft. Rigid connection of the electric machine to the respective component transmission input shaft and/or to the output shaft thus is ensured. This results in good efficiency when operating the electric machine as a generator via the output shaft or the component transmission input shaft coupled to the combustion engine. Moreover, an operative connection between the electric machine, the output shaft and the component transmission input shaft advantageously obtains an additional gear stage of the dual clutch transmission.

The electric machine also may be connected positively and operatively to the other component transmission input shaft and/or to the output shaft. This embodiment of the drive system also may have, in each case, one electric machine gearwheel pair with a clutch element for positive operative connection of the electric machine to one of the component transmission input shafts and/or to the output shaft. The drive system furthermore has, in each case, one further electric machine gearwheel pair with a further clutch element for positive operative connection of the electric machine to the other component transmission input shaft and/or to the output shaft. A further additional gear stage of the dual clutch transmission thereby advantageously is obtained. Moreover, an operative connection between the two component transmission input shafts is possible to obtain parallel screw gears.

The electric machine of the drive system preferably can be connected positively and operatively via a gearwheel pair of one gear stage of one of the component transmissions to the corresponding component transmission input shaft and/or to the main shaft. The gearwheel pair of the gear stage on the corresponding component transmission input shaft and on the main shaft preferably has a loose wheel pair that can be fixed positively on the component transmission input shaft and/or on the main shaft, in each case by a clutch element to drive the component transmission and/or the main shaft. In this case, already existing transmission stages of the dual clutch transmission advantageously can be used to connect up the electric machine, thereby reducing both the number of components required and the weight of the drive system.

The electric machine of the drive system preferably is arranged to be connected positively and operatively to a gearwheel of the gearwheel pair. The gearwheel is arranged on the corresponding component transmission input shaft. Connecting the electric machine directly to the combustion engine via the component transmission input shaft advantageously ensures good efficiency in the case of a shift in the load point.

The electric machine of the drive system preferably is arranged to be connected positively and operatively to a gearwheel of the gearwheel pair. The gearwheel is arranged on the main shaft. Connecting the electric machine directly to the main shaft ensures high efficiency during the recovery of vehicle braking energy.

The electric machine preferably is designed to be decoupled from the drive system. This advantageously reduces the inertia effects due to the electric machine when a vehicle with a drive system is being driven in a highly dynamic way.

The electric machine preferably is connected rigidly to one component transmission. This advantageously ensures that the drive system is of simple design.

The electric machine can be nonpositively operatively connected to the output shaft by a clutch device, and preferably a friction clutch. This design gives a degree of freedom in terms of speed between the combustion engine and a driven vehicle wheel, thereby advantageously ensuring the functionality of restarting the combustion engine at low vehicle speeds.

The drive system preferably has in each case one electric machine gearwheel pair with a clutch element for positive operative connection of the electric machine to the input shaft and/or to the output shaft. Rigid connection of the electric machine to the input shaft and/or to the output shaft thus is ensured. This design results in good efficiency when operating the electric machine as a generator via the output shaft or the input shaft coupled to the combustion engine. Moreover, an additional gear stage of the shift transmission advantageously is obtained when there is an operative connection between the electric machine, the output shaft and the input shaft.

The electric machine of the drive system can be connected positively and operatively via a gearwheel pair of one gear stage of the automated shift transmission to the input shaft and/or to the main shaft. In this case, already existing transmission stages of the shift transmission advantageously can be used to connect up the electric machine, thereby advantageously reducing both the number of components and the weight of the drive system.

The invention is explained in greater detail below by means of illustrative embodiments with reference to the attached schematic figures of the drawing.

DETAILED DESCRIPTION OF PREFERRED EMBODIMENTS

Preferred illustrative embodiments of the invention are explained below with reference to FIGS. 1 to 7. The same reference signs are used in the figures to denote identical or functionally identical components, unless stated otherwise.

Figure 1:
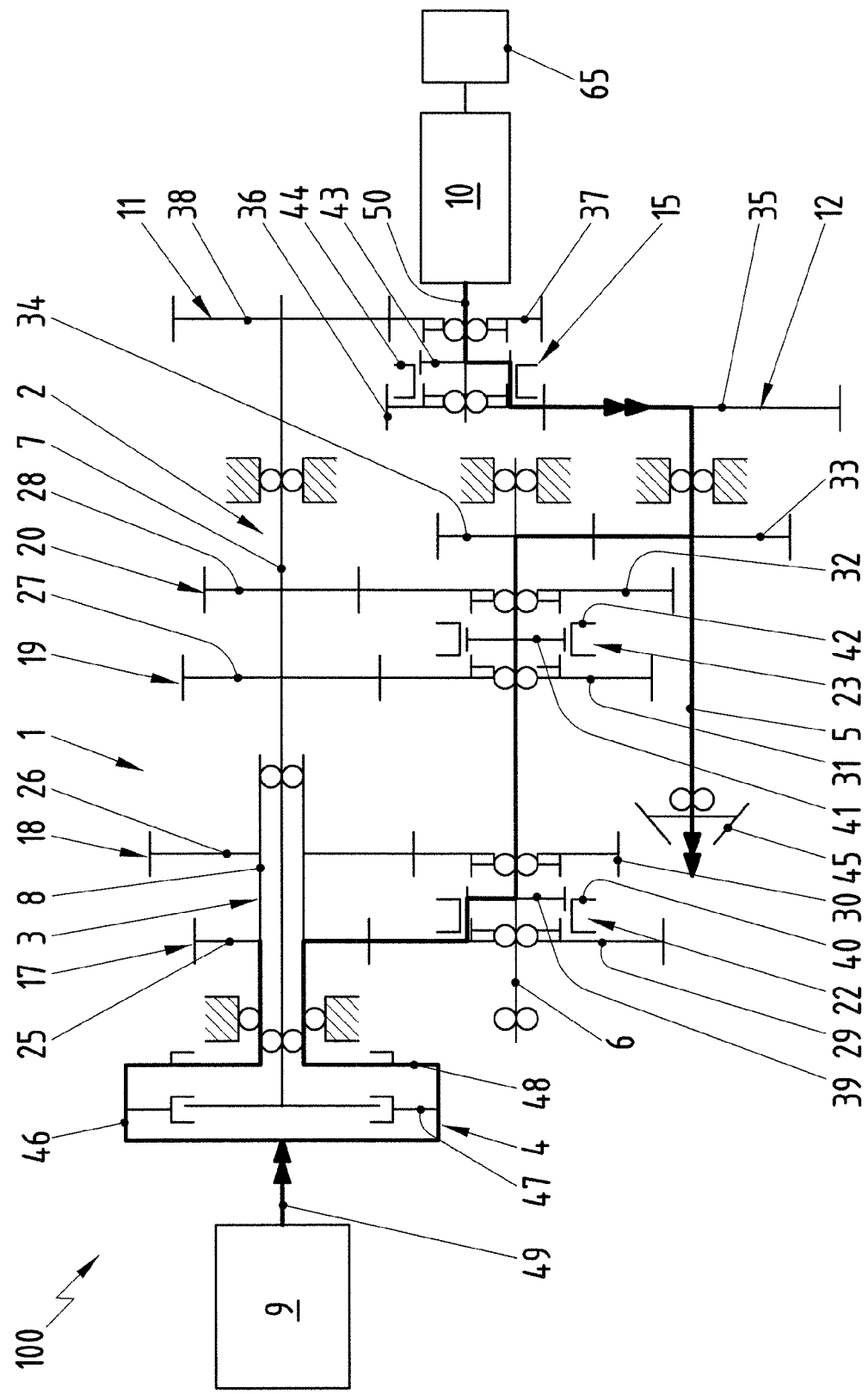
FIG. 1 is a plan view of a drive system according to a first embodiment of the invention.

FIG. 1 shows a drive system 100 with a dual clutch transmission 1, a combustion engine 9 and an electric machine 10. The electric machine 10 can be operated either as an electric motor or as a generator. The dual clutch transmission 1 of this embodiment a four-speed transmission, however, any other number of speeds can be employed. In the following text, the term "loose wheel" means a gearwheel rotatably mounted on a shaft, and the term "fixed wheel" mean a gearwheel fixed nonpositively or positively on the shaft. The gearwheels of the dual clutch transmission 1 preferably are spur wheels, and preferably helically toothed spur wheels. The combustion engine 9 is connected positively or materially via an output shaft 49 to a clutch housing 46 of a dual clutch 4 of the dual clutch transmission 1. The dual clutch 4 has first and second clutches 47 and 48 that preferably are wet multi-plate clutches. The first clutch 47 enables a first component transmission input shaft 7 of a first component transmission 2 of the dual clutch transmission 1 to be nonpositively operatively connected to the clutch housing 46 and hence to the output shaft 49 of the combustion engine 9. The second clutch 48 of the dual clutch 4 enables a second component transmission input shaft 8 of a second component transmission 3 of the dual clutch transmission 1 to be nonpositively operatively connected to the clutch housing 46 of the dual clutch 4. In this case, the dual clutch 4 selectively can establish a nonpositive connection between the clutch housing 46 and the first component transmission input shaft 7 or the second component transmission input shaft 8. Moreover, both component transmission input shafts 7, 8 can be decoupled from the clutch housing 46 of the dual clutch 4 and thus from the combustion engine 9. In this case, the second component transmission input shaft 8 is a hollow shaft, and the first component transmission input shaft 7 of the first component transmission 2 is a solid shaft mounted in the hollow second component transmission input shaft 8.

The first component transmission 2 of the dual clutch transmission 1 is assigned a first group of transmission gears. In the present case, there are the uneven-numbered transmission gears, one and three, which define gearwheel pairs 20 and 19. The gearwheel pair 19 of the third gear has a gearwheel 27 fixed materially or nonpositively on the component transmission input shaft 7. Gear stage one has a gearwheel 28 that also is fixed positively or materially on the component transmission input shaft 7. The gearwheel 27 of gearwheel pair 19 engages a gearwheel 31, which is arranged as a loose wheel on a main shaft 6 of the dual clutch transmission 1. The main shaft 6 is parallel to the component transmission input shafts 7, 8. The gearwheel 28 of gearwheel pair 20 engages a gearwheel 32, which also is a loose wheel on the main shaft 6. Depending on the installation space available, the gearwheels 27, 28 may be loose wheels and the gearwheels 31, 32 may be fixed wheels. The gearwheels 31, 32 are assigned a clutch element 23 that is arranged between gearwheels 31, 32 in the axial direction of the main shaft 6. The clutch element can be a synchronizer 23 and has a fixed wheel 41 on the main shaft 6, optional synchronizer rings (not shown in FIG. 1), and a shift sleeve 42 that can be moved on the fixed wheel 41 in the axial direction of the main shaft 6 by a shift mechanism (not shown in FIG. 1). The shift sleeve 42 is substantially annular and has an internal tooth system that is complementary to the fixed wheel 41 and can be brought selectively into engagement with tooth systems formed on the loose wheels 31, 32. Moving the shift sleeve 42 axially in the direction of loose wheel 31 or in the direction of loose wheel 32 enables a positive connection between loose wheel 31 or loose wheel 32 and the main shaft 6 via the shift sleeve 42 and fixed wheel 41. The clutch element 23 has the optional synchronizer rings to synchronize the speeds of the main shaft 6 and the loose wheel 31 or 32.

The second component transmission 3 of the dual clutch transmission 1 has even-numbered gear stages two and four. Gear stage two is assigned a gearwheel pair 17 comprising gearwheels 25 and 29, and gear stage four is assigned a gearwheel pair 18 comprising gearwheels 26 and 30. The gearwheel 25 is a fixed wheel on component transmission input shaft 8. The gearwheel 29 engages the gearwheel 25 and is designed as a loose wheel on the main shaft 6. The gearwheel 26 of gearwheel pair 18 is a fixed wheel on component transmission input shaft 8, and the gearwheel 30 in engagement with gearwheel 26 also is a loose wheel on the main shaft 6. In alternative embodiments of the dual clutch transmission 1, the loose wheels can be fixed wheels and vice versa. The gearwheels 29 and 30 are assigned a clutch element 22. In the present embodiment, the clutch element 22 is a synchronizer 22 with a fixed wheel 39 on the main shaft 6, a shift sleeve 40 and optional synchronizer rings (not shown). The shift sleeve 40 can be actuated by a shift mechanism. The clutch element 22 is provided between the gearwheels 29 and 30 in the axial direction of the main shaft 6. The operation and construction of clutch element 22 is identical with the operation and construction of clutch element 23.

A fixed wheel 34 also is arranged on the main shaft 6 and engages a fixed wheel 33 on the output shaft 5. The output shaft 5 is parallel to the main shaft and the component transmission input shafts 7, 8. The output shaft 5 further has an output wheel 45, in the form of a helically toothed bevel wheel, for example. The output wheel 45 is used to drive a drive axle or at least one driven wheel of a vehicle, for example.

The electric machine 10 has an output shaft 50 arranged parallel to the shafts 5-8. Loose wheels 36, 37 are provided on the output shaft 50 of the electric machine 10 and are assigned a clutch element 15. The clutch element 15 preferably is a synchronizer 15 with a fixed wheel 43 fixed on the output shaft 50, a shift sleeve 44 and optional synchronizer rings. The synchronizer 15 is arranged between the gearwheels 36, 37 in the axial direction of output shaft 50. The operation and construction of clutch element 15 correspond to the operation and construction of clutch elements 22, 23. Thus, one of gearwheels 36, 37 can be fixed positively on the output shaft 50 of the electric machine 10 by means of the clutch element 15. The gearwheel 37 is part of an electric machine gearwheel pair 11 and engages a fixed wheel 38 on the first component transmission input shaft 7. The gearwheel 36 of another electric machine gearwheel pair 12 engages a gearwheel 35 that is a fixed wheel on the output shaft 5. Thus, the output shaft 50 of the electric machine 10 can be connected operatively either to the first component transmission input shaft 7 or to the output shaft 5 by the clutch element 15. The electric machine 10 also is assigned a fluid delivery device 65 that is coupled to the output shaft 50 of the electric machine 10 either directly or by means of a gearwheel pair. The fluid delivery device 65 preferably is an oil pump for supplying the dual clutch transmission 1 with transmission oil in the electric operating mode. This advantageously eliminates the need for an additional electric transmission oil pump.

In the arrangement of FIG. 1, the second clutch 48 of the dual clutch 4 is closed, i.e. a torque of the combustion engine 9, represented by the thick line, is transmitted via the output shaft 49 of the combustion engine 9, the clutch housing 46, the second clutch 48 and the second component transmission input shaft 8 to the gearwheels 25 and 26 of the second component transmission 3. The shift sleeve 40 of clutch element 22 has been moved to the left and toward the gearwheel 29. Thus, the gearwheel 29 is fixed positively on the main shaft 6. The second component transmission 3 therefore is in the second transmission gear. The torque of the combustion engine 9 thus is transmitted from gearwheel 25 to output gearwheel 45 via gearwheel 29, clutch element 22, the main shaft 6, fixed wheels 34, 33 and output shaft 5. This imparts motion to at least one vehicle wheel of the vehicle, for example.

During this process, the next gear required can be preselected in the first component transmission 2 by the clutch element 23. In the present case, this would be the third transmission gear, which comprises the gearwheel pair 19. For this purpose, the shift sleeve 42 of clutch element 23 is pushed toward the gearwheel 31. An optional adaptation of the speed of the first component transmission input shaft 7 to the speed of the main shaft 6 may be carried out by one of the synchronizer rings of the clutch element 23. The gearwheel 31 then is fixed positively on the main shaft 6 by the shift sleeve 42 and fixed wheel 41. The second clutch 48 opens and the first clutch 47 of the dual clutch 4 simultaneously closes during a gear change from the selected second gear to the preselected third gear. Thus, nonpositive engagement between the clutch housing 46 of the dual clutch 4 and the first component transmission input shaft 7 of the first component transmission 2 is established. Shifting without interrupting tractive effort is thus possible.

In parallel with this, the output shaft 5 is driven by the electric machine 10. For this purpose, the shift sleeve 44 of clutch element 15 is moved left toward the gearwheel 36. In this case, the gearwheel 36 is fixed positively on output shaft 50. A torque of the electric machine 10 is transmitted to output gearwheel 45 via the output shaft 50 of the electric machine 10, clutch element 15, gearwheel 36, gearwheel 35 and output shaft 5. The combustion engine 9 and the electric machine 10 thus operate cumulatively. Alternatively, the electric machine 10 can be decoupled from both the first component transmission input shaft 7 and the output shaft 5 by positioning the shift sleeve 44 of the clutch element 15 centrally to put the electric machine 10 in an idling mode. Decoupling the electric machine 10 from the drive system 1 reduces the drag torques caused by the electric machine 10 at high vehicle speeds. Moreover, inertia effects caused by the electric machine 10 are reduced when the vehicle is being driven in a highly dynamic way.

To recover braking energy, the electric machine 10 operates as a generator, and the combustion engine 9 is decoupled from the component transmission input shafts 7, 8. Torque then is transmitted to the output shaft 50 of the electric machine 10 by the output gearwheel 45, the output shaft 5, the gearwheel pair 12 and the clutch element 15. This positive direct connection of the electric machine 10 to output shaft 5 results in good efficiency during recovery. Connecting the electric machine to the first component transmission input shaft 7 through appropriate positioning of the shift sleeve 44 of clutch element 15 and closing the first clutch 47 of the dual clutch 4 ensures direct connection of the electric machine 10 to the output shaft 49 of the combustion engine 9, thereby giving a high efficiency in the case of a shift in the load point. Moreover, the combustion engine 9 can be started in an idling position of gear stages one to four of the dual clutch transmission 1 when the electric machine 10 is operated in the electric motor mode, thereby eliminating the need for a separate starter motor. When the electric machine 10 is operated as a generator, it can be driven by the combustion engine 9 in the above-described idling position of the dual clutch transmission 1, e.g. in phases when the vehicle is waiting at traffic lights, so as to charge electrical energy storage devices. Coupling the electric machine 10 directly to output shaft 5 or to the combustion engine 9 results in optimized efficiency.

Figure 2:
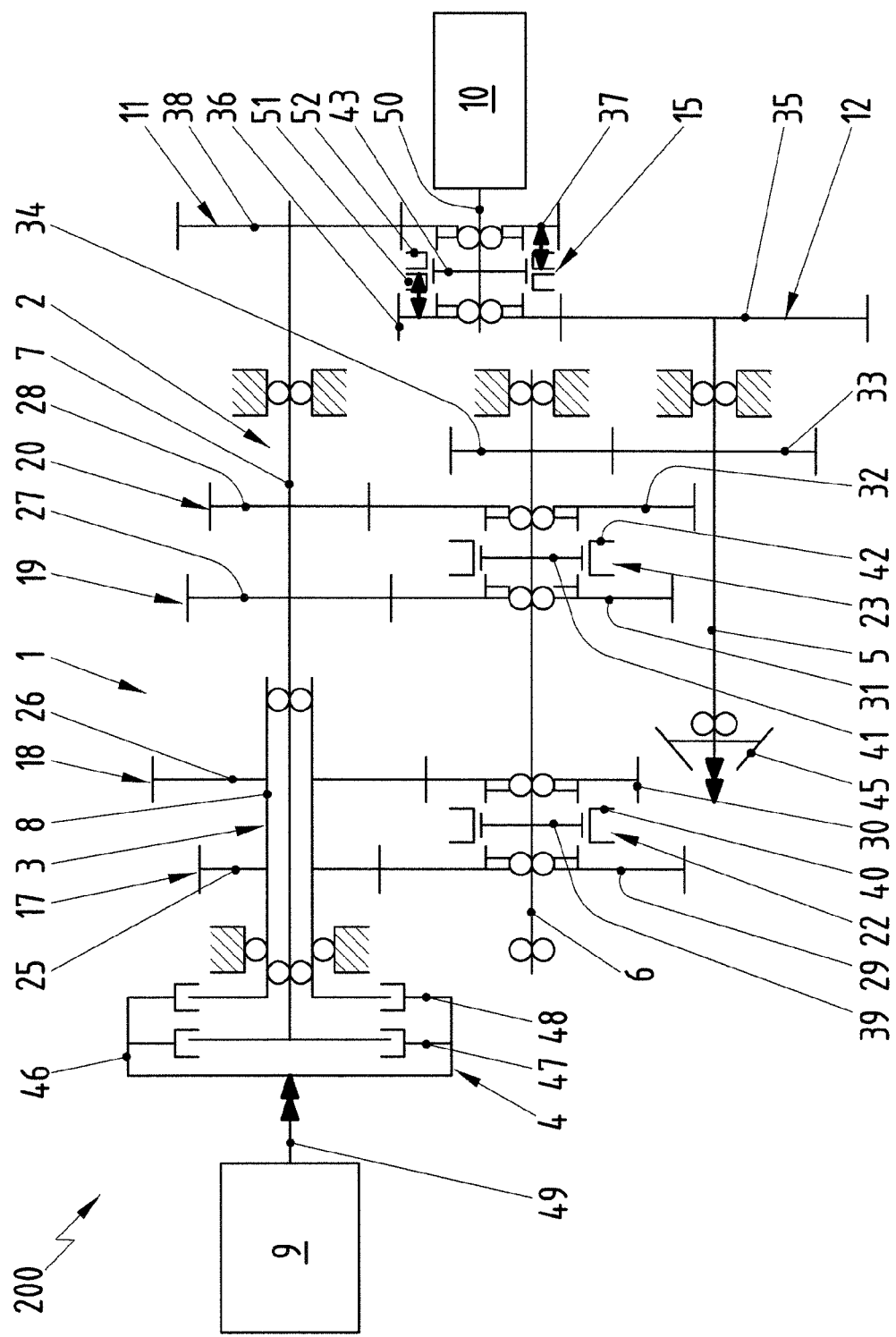
FIG. 2 is a plan view of a drive system according to a second embodiment of the invention.

FIG. 2 shows a drive system 200 in accordance with a second embodiment of the invention. The drive system 200 differs from the drive system 100 in FIG. 1 in that the clutch element 15 of the electric machine 10 has two shift sleeves 51, 52. In this case, the shift sleeve 51 is assigned to gearwheel 36 of the gearwheel pair 12, and the shift sleeve 52 is assigned to gearwheel 37 of the gearwheel pair 11. The shift sleeves 51, 52 can be moved independently of one another in the axial direction of the output shaft 50 of the electric machine 10. The two shift sleeves 51, 52 enable the output shaft 50 of the electric machine 10 to be connected to the first component transmission input shaft 7 and/or to output shaft 5. In contrast to the drive system 100 of FIG. 1, the electric machine 10 can be connected positively and operatively to the first component transmission input shaft 7 and output shaft 5 simultaneously. Thus, a power flow between the electric machine 10, the first component transmission input shaft 7 and output shaft 5 can be established so that one gear stage of the dual clutch transmission 1 can be replaced or one gear stage can be added in addition to the functionality of the drive system 100 of FIG. 1.

Figure 3:
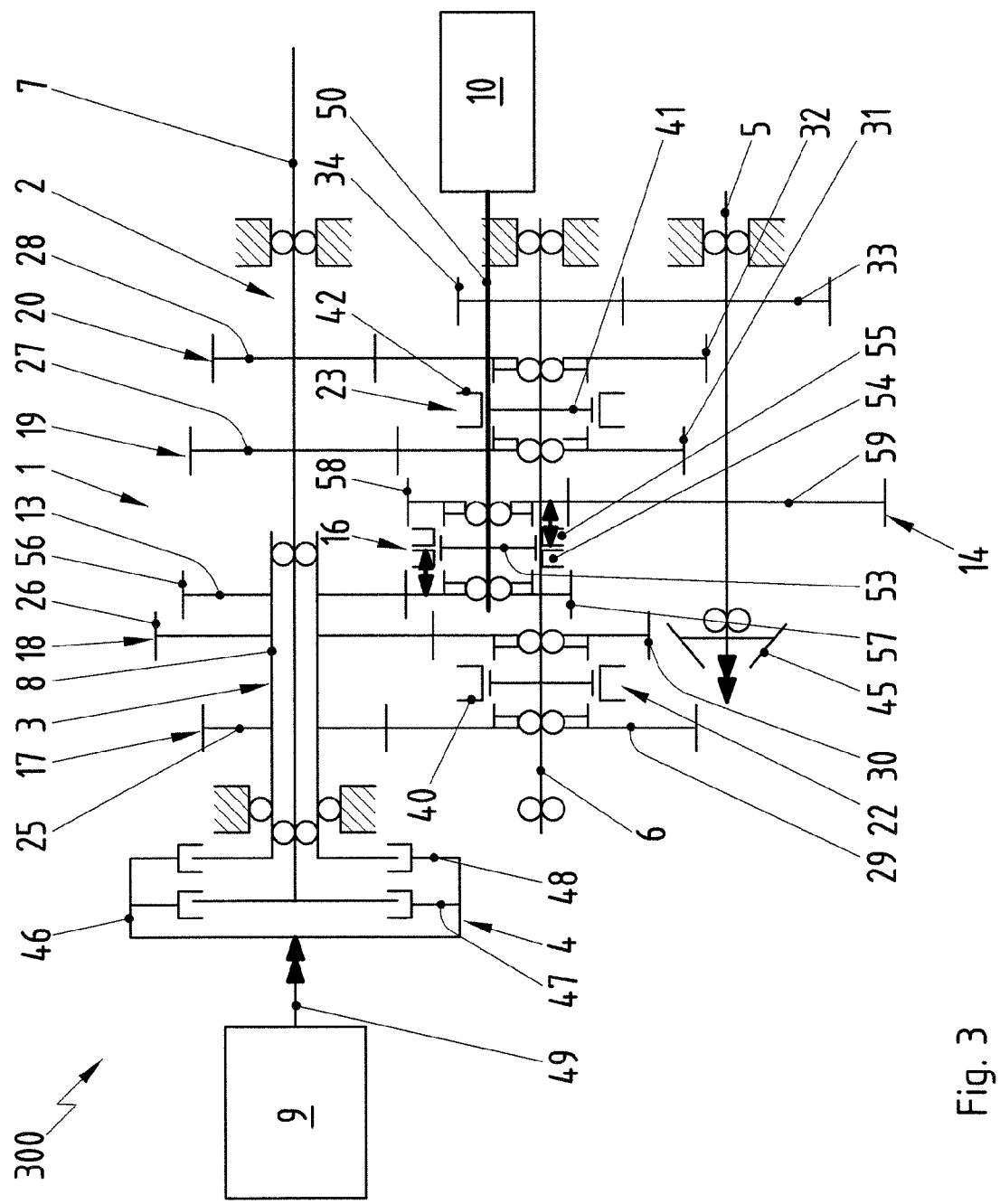
FIG. 3 is a plan view of a drive system according to a third embodiment of the invention.

FIG. 3 shows a third embodiment of a drive system 300. The drive system 300 differs from the drive system 200 of FIG. 2 in that the electric machine 10 can be connected operatively to the second component transmission input shaft 8 of the second component transmission 3 rather than to the first component transmission input shaft 7 of the first component transmission 2. Two loose wheels 57 and 58 are arranged rotatably on the output shaft 50 of the electric machine 10 and are assigned a clutch element 16. The clutch element 16 is arranged between gearwheels 57, 58 in the axial direction of output shaft 50 and has a fixed wheel 53 arranged on the output shaft 50, and two shift sleeves 54 and 55. The shift sleeve 54 is assigned to the gearwheel 57, and the shift sleeve 55 is assigned to the gearwheel 58. The operation of the clutch element 16 corresponds to the operation of clutch element 15, comprising the two shift sleeves 51, 52 of the drive system 200 of FIG. 2. The gearwheel 57 is assigned to an electric machine gearwheel pair 13 and engages a fixed wheel 56, which also is assigned to the electric machine gearwheel pair 13. The fixed wheel 56 is arranged on the second component transmission input shaft 8 of the second component transmission 3. A further electric machine gearwheel pair 14 has the loose wheel 58 and a fixed wheel 59 that engages the loose wheel 58 and is arranged on output shaft 5.

The drive system 300 has the advantages of the drive system 200 of FIG. 2. Moreover, the drive system 300 of FIG. 3 has the advantage that it is not necessary to deactivate or decouple the electric machine when starting the vehicle in the first transmission gear. This results in an advantage in terms of acceleration, especially when starting the vehicle quickly.

Figure 4:
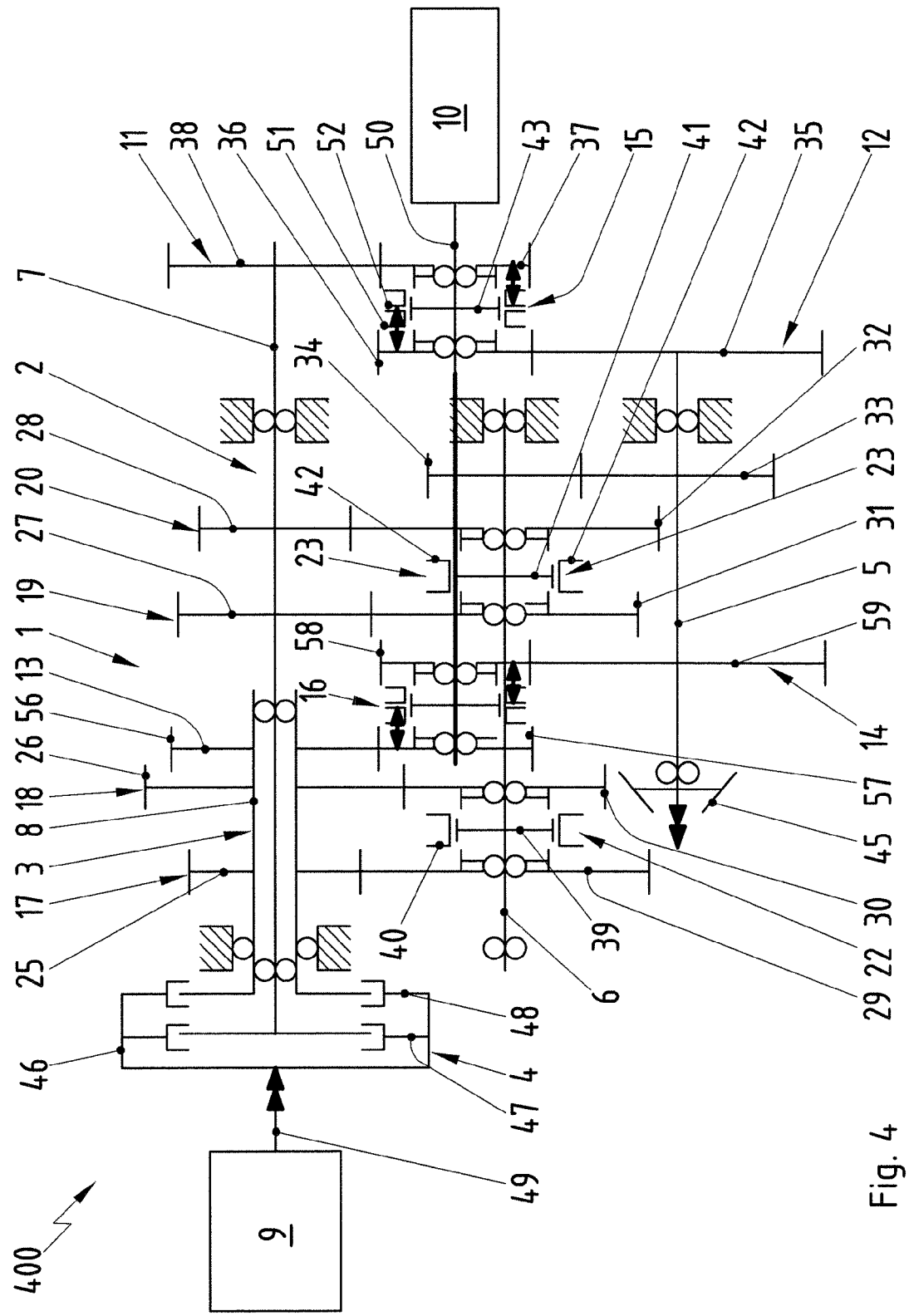
FIG. 4 is a plan view of a drive system according to a fourth embodiment of the invention.

FIG. 4 shows a drive system 400 in accordance with a fourth embodiment of the invention. In contrast to the embodiments of the drive systems 200 and 300 of FIGS. 2 and 3, the drive system 400 offers the possibility of connecting the electric machine 10 operatively to the output shaft 5 and to both component transmission input shafts 7, 8. As described above, the output shaft 50 of the electric machine 10 can be connected operatively to the first component transmission input shaft 7 and/or to output shaft 5 by means of electric machine gearwheel pairs 11 and/or 12. Moreover, the output shaft 50 can be connected operatively to the second component transmission input shaft 8 and/or to output shaft 5 by means of electric machine gearwheel pairs 13 and/or 14.

The following possibilities for coupling the electric machine 10 to the dual clutch transmission 1 are obtained. First, the electric machine 10 can be decoupled completely from the dual clutch transmission 1 through appropriate positioning of shift sleeves 51, 52, 54, 55. This reduces the drag torques caused by the electric machine 10 when traveling at high speed and the inertia effects caused by the electric machine 10 when a vehicle with a drive system 400 is being driven in a highly dynamic way. Coupling the electric machine 10 to the first or second component transmission input shaft 7, 8 results in good efficiency in the case of a shift in the load point to the direct connection to the output shaft 49 of the combustion engine 9. Depending on the desired transmission ratio, the electric machine 10 is coupled either to the first or the second component transmission input shaft 7, 8. If the electric machine 10 is connected operatively to the first or the second component transmission input shaft 7, 8 and output shaft 5, one gear stage can advantageously be replaced in each case. An operative connection between the first component transmission input shaft 7, the electric machine 10 and the second component transmission input shaft 8 enable the use of parallel winding path gears.

Figure 5:
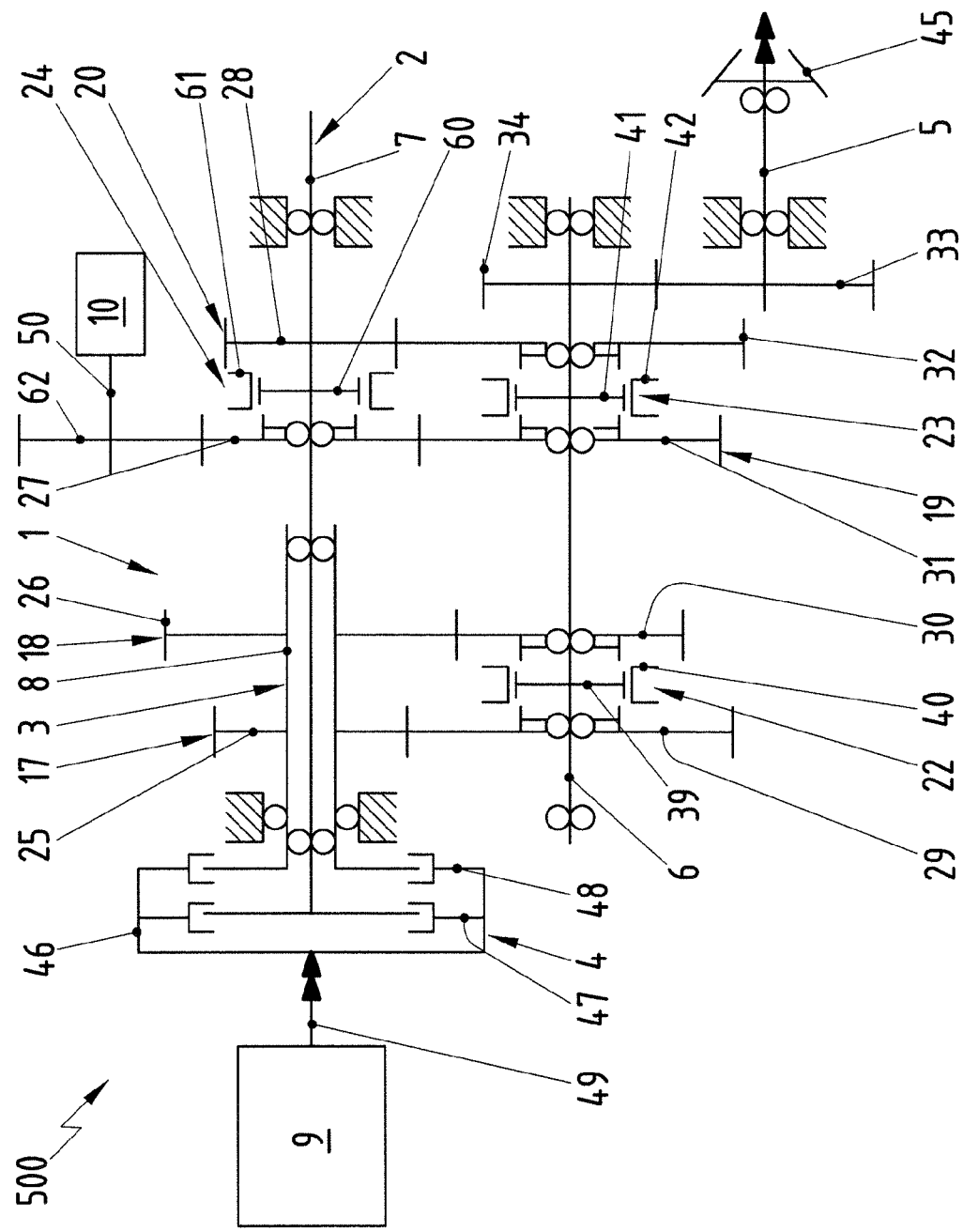
FIG. 5 is a plan view of a drive system according to a fifth embodiment of the invention.

FIG. 5 shows a drive system 500 according to a fifth embodiment of the invention. According to this embodiment of the drive system 500, one of the gearwheels 25, 26, 27, 28 of the first or of the second component transmission 2, 3 on the corresponding component transmission input shaft 7, 8 is designed as a loose wheel. In the present preferred illustrative embodiment of drive system 500, the gearwheel 27 of the third transmission gear is designed as a loose wheel on the first component transmission input shaft 7. As an alternative, in other design variants, the electric machine 10 can be coupled to all the other gear stages of the dual clutch transmission 1. A fixed wheel 62 is arranged on the output shaft 50 of the electric machine 10, which shaft is parallel to the first component transmission input shaft 7, and is in engagement with gearwheel 27. Gearwheel 27 is assigned a clutch element 24 in the form of a synchronizer 24 with a fixed wheel 60 provided on the first component transmission input shaft 7, a shift sleeve 61 and an optional synchronizer ring. The construction and functionality of clutch element 24 corresponds to the construction and functionality of clutch elements 22, 23, except for the fact that clutch element 24 is assigned to just one loose wheel. The appropriate positioning of the shift sleeves 61 or 42 of clutch elements 24 or 23 enables the electric machine 10 to be decoupled from the dual clutch transmission 1, and to be positively operatively connected to the first component transmission input shaft 7 and/or to the main shaft 6.

The use of existing clutch elements, e.g. of clutch element 23, is particularly advantageous in the drive system 500. As a result, the drive system 500 requires less installation space, and the number of required components is reduced, thereby reducing the weight and production costs of drive system 500. Optimized efficiency in the case of a shift in the load point is obtained by virtue of the fact that the electric machine 10 can be connected directly to the output shaft 49 of the combustion engine 9 via the first component transmission input shaft 7 and the dual clutch 4. Moreover, the electric machine 10 can be decoupled from drive system 500 to reduce high drag torques at high vehicle speeds and to reduce inertia effects when the vehicle is being driven in a highly dynamic way.

Figure 6:
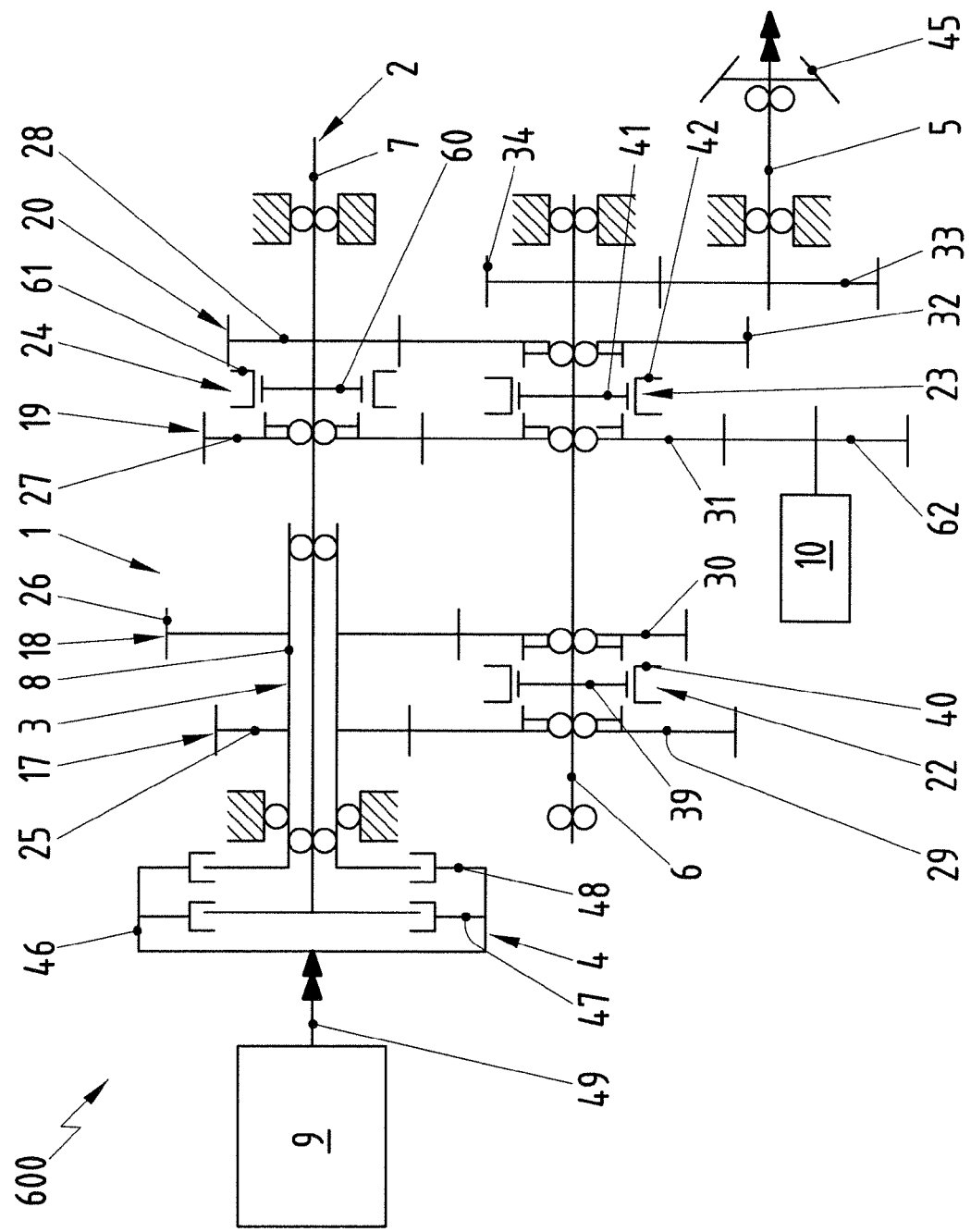
FIG. 6 is a plan view of a drive system according to a sixth embodiment of the invention.

FIG. 6 shows a drive system 600 in accordance with a sixth embodiment. The drive system 600 differs from the drive system 500 of FIG. 5 only in that gearwheel 62 is not engaged with the gearwheel 27 arranged on the first component transmission input shaft 7 but with the gearwheel 31 arranged on the main shaft 6. Coupling the electric machine directly to the main shaft 6 and hence to output shaft 5 or to a driven wheel of the vehicle advantageously results in optimum efficiency when the vehicle is braked while the electric machine is being operated as a generator. Moreover, the use of already existing components is particularly advantageous in this embodiment.

Figure 7:
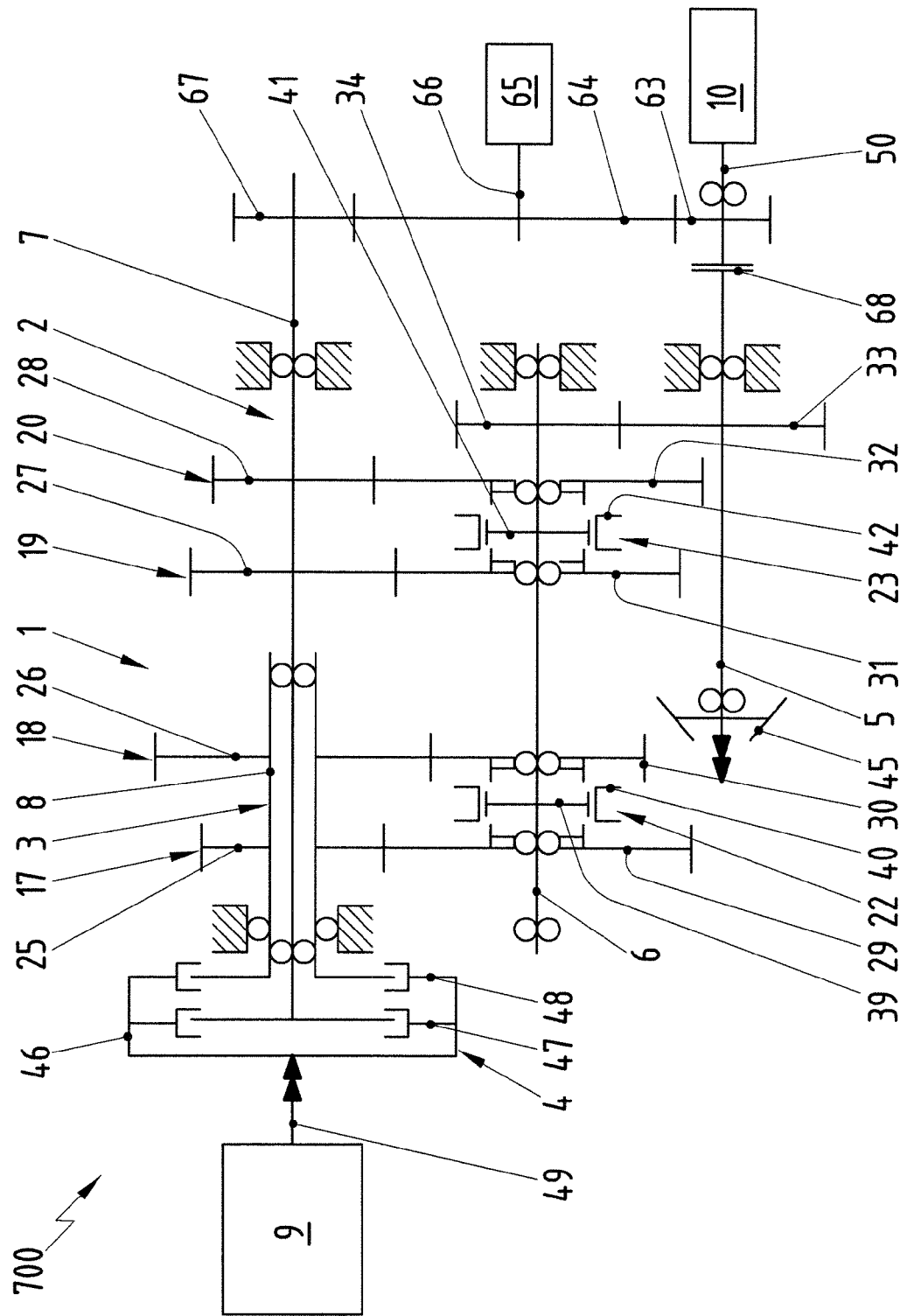
FIG. 7 is a plan view of a drive system according to a seventh embodiment of the invention.

FIG. 7 shows a drive system 700 according to a seventh embodiment. The output shaft 50 of the electric machine 10 of the drive system 700 can be connected nonpositively to output shaft 5 by a clutch device 68. The clutch device 68 preferably is a friction clutch, e.g. a multi-plate clutch. A gearwheel 63 designed as a fixed wheel is arranged on output shaft 50 and engages a gearwheel 64 on a drive shaft 66 of a fluid delivery device 65, which preferably is an oil pump for supplying the dual clutch transmission 1 with transmission oil. The drive shaft 66 is parallel to the output shaft 50 of the electric machine 10. The gearwheel 64, in turn, engages a gearwheel 67, which is a fixed wheel on the first component transmission input shaft 7. As an alternative, the gearwheel 67 also can be provided on the second component transmission input shaft 8 of the second component transmission 3. The gearwheel 63 also can be in direct engagement with gearwheel 67. In contrast to the embodiments of the drive system 100, 200, 300, 400, 500, 600 in FIGS. 1 to 6, the electric machine 10 is coupled rigidly to one of the component transmission input shafts 7, 8 and can be nonpositively operatively connected to output shaft 5.

This arrangement of the drive system 700 with the clutch device 68 allows a degree of freedom in terms of speed between the combustion engine 9 and a driven vehicle wheel in the electric drive mode. This embodiment of the drive system 700 provides a restart functionality for the combustion engine 9 at low vehicle speeds. For this purpose, no gear is selected in the first component transmission 2, to which the electric machine 10 is connected rigidly. This means that the shift sleeve 42 of the synchronizer 23 is not in engagement with either of gearwheels 31, 32. The electric machine 10 then transmits a torque to output shaft 5 via clutch device 68. If there is a demand for starting, by way of an engine controller for example, the system checks whether the speed of the first clutch 47 would be sufficient to start the combustion engine 9. If the clutch speed is too low, starting the combustion engine 9 is uncomfortable for passengers in the vehicle since the speed of the combustion engine 9 can be several times the speed of the first transmission input shaft 7 as the combustion engine 9 speeds up, resulting in a torque reversal. If the clutch speed is too low, the clutch device 68 is set to slip, resulting in an increase in the speed of the electric machine 10. As a result, the speed of the first clutch 47 also is increased by way of the positive operative connection between the electric machine 10 and the first component transmission input shaft 7 to start the combustion engine 9 comfortably with a sufficiently high clutch speed. The fluid delivery device 65, which preferably is an oil pump, is connected positively and operatively to the electric machine 10. Thus, the device can supply the dual clutch transmission 1 with oil when the vehicle is being driven by electric power. This advantageously eliminates the need for an electric transmission oil pump.

Figure 8:
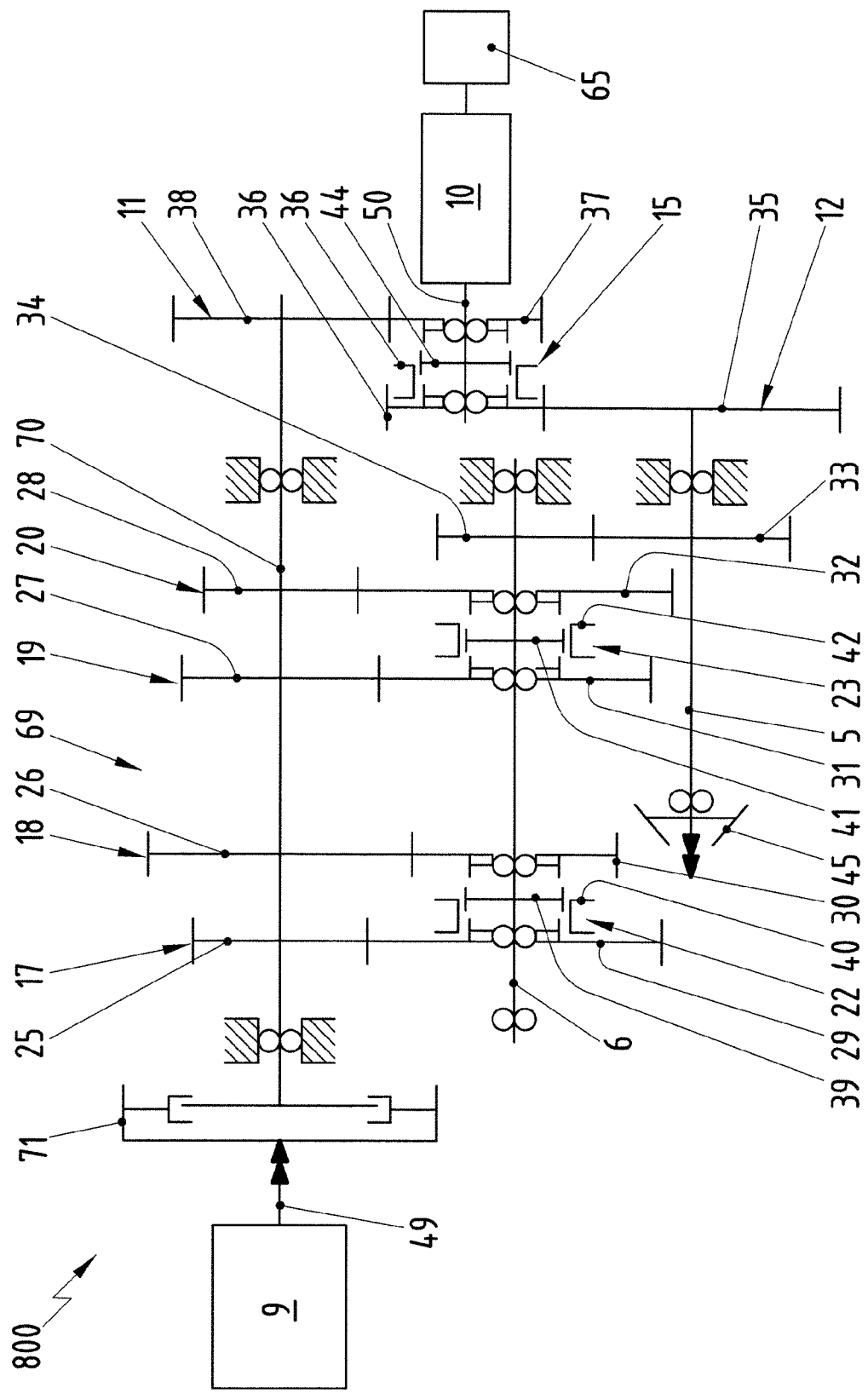
FIG. 8 is a plan view of a drive system according to an eighth embodiment of the invention.

FIG. 8 shows a drive system 800 in accordance with an eighth embodiment. The drive system 800 differs from the drive system 100 of FIG. 1 in that an automated shift transmission 69 is provided instead of the dual clutch transmission 1. The automated shift transmission has a clutch 71 and an input shaft 70. The fixed wheels 25, 26, 27, 28 arranged on the input shaft 70 are assigned to the gear stages of the shift transmission 69 and engage the loose wheels 29, 30, 31, 32 on the main shaft 5. The input shaft 70 is parallel to the main shaft 6 and output shaft 5. The automated shift transmission 69 is actuated by electric or hydraulic actuators, for example. In this case, both the actuation of the clutch 71 and the actuation of clutch elements 22, 23 for gear selection can be accomplished automatically.

Nonpositive engagement between the output shaft 49 of the combustion engine 9 and the input shaft 70 can be established by closing the clutch 71. Before the clutch 71 is closed, a desired operative connection between the input shaft 70, the main shaft 6 and output shaft 6 is established by appropriate shifting of clutch elements 22, 23.

In parallel therewith, the electric machine 10 is decoupled from drive system 800 by the clutch element 15 and operatively connected to the input shaft 70 or to the output shaft 5. Given appropriate design of clutch element 15 with two shift sleeves 51, 52, an operative connection between the electric machine 10, the input shaft 70 and output shaft 5 can also be achieved. The advantages of this drive system 800 correspond to those of the embodiments of the drive system 100, 200 according to FIGS. 1 and 2.

Figure 9:
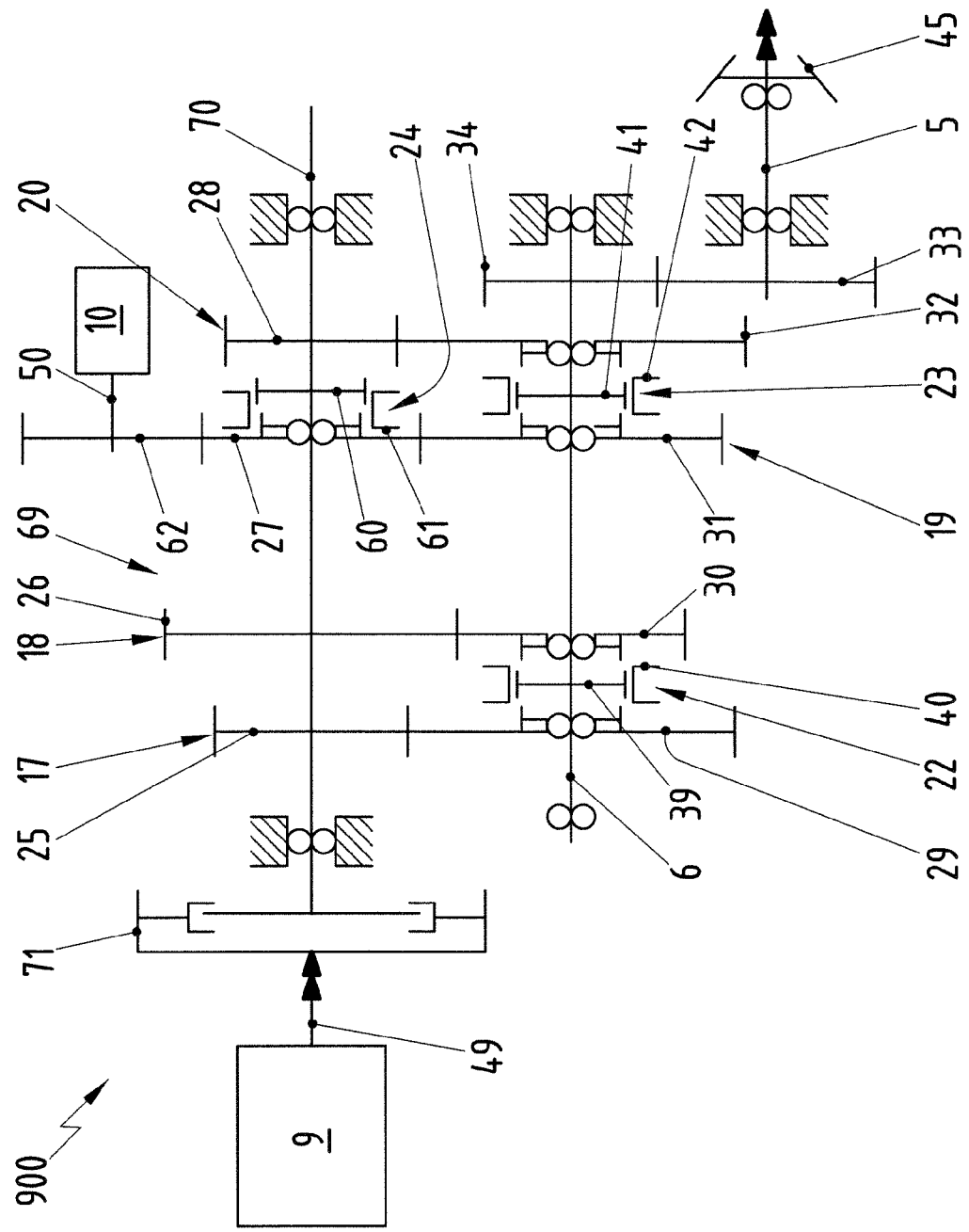
FIG. 9 is a plan view of a drive system according to a ninth embodiment of the invention.

FIG. 9 shows a ninth embodiment of a drive system 900. The drive system 900 corresponds to the drive system 500 of FIG. 5 with the further development that the automated shift transmission 69 is provided instead of the dual clutch transmission 1.

The use of existing clutch elements, e.g. of clutch element 23, is an advantage of the drive system 900. Optimized efficiency in the case of a shift in the load point is obtained by virtue of the fact that the electric machine 10 can be connected to the output shaft 49 of the combustion engine 9 directly via the input shaft 70 and clutch 71.

Figure 10:
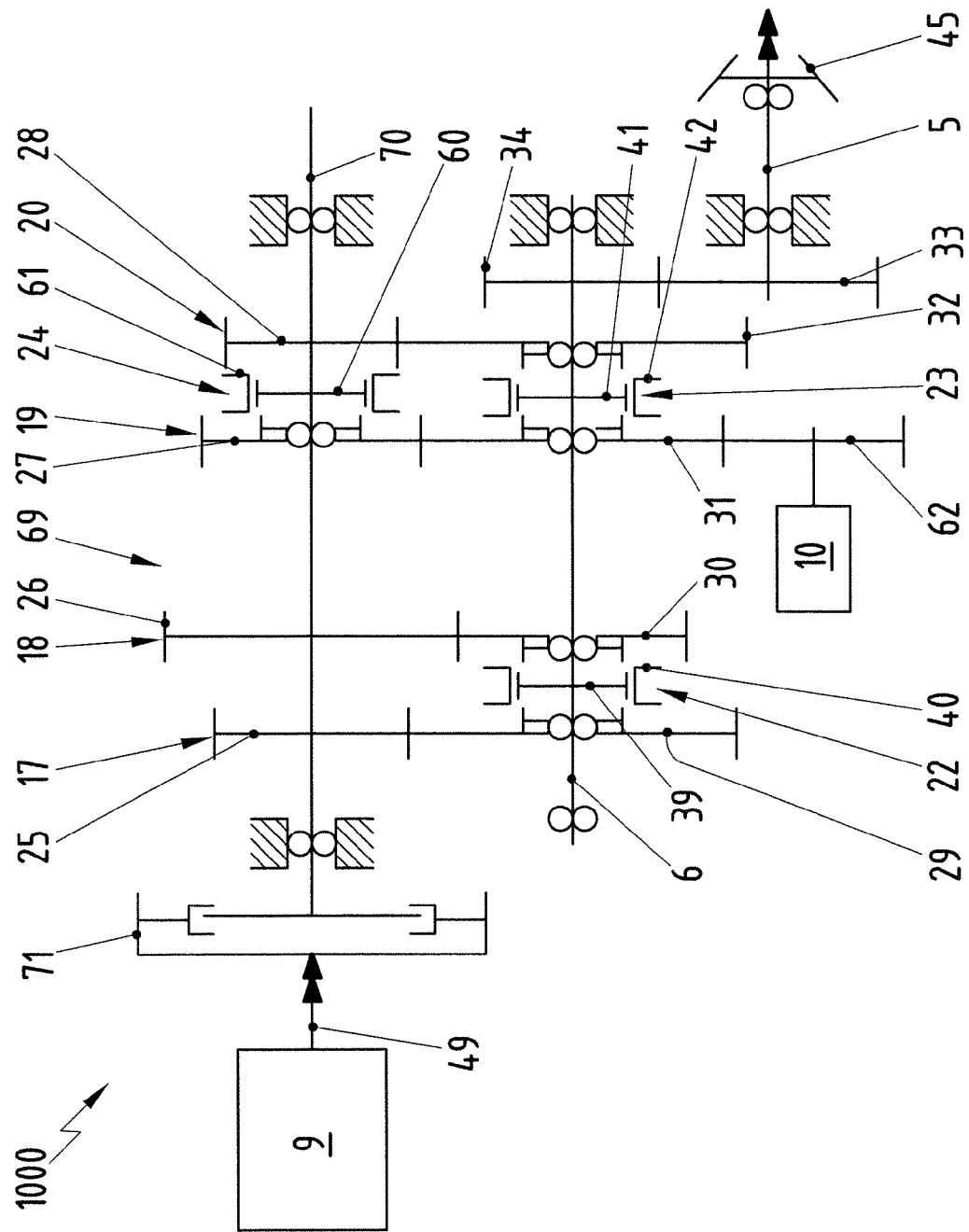
FIG. 10 is a plan view of a drive system according to a tenth embodiment of the invention.

FIG. 10 shows a tenth embodiment of a drive system 1000. The drive system 1000 differs from the drive system 900 of FIG. 9 only in that gearwheel 62 does not engage the gearwheel 27 on the input shaft 70 but with the gearwheel 31 on the main shaft 6. Coupling the electric machine directly to the main shaft 6 and hence to output shaft 5 or to a driven wheel of the vehicle advantageously results in optimum efficiency when the vehicle is braked while the electric machine is being operated as a generator. Moreover, the use of already existing components is an advantage this embodiment.

What is claimed is:

1. A drive system, for a motor vehicle, comprising:
   a dual clutch transmission that has two component transmissions, a dual clutch and an output shaft, the two component transmissions comprising a common main shaft, each component transmission having one component transmission input shaft that can be connected operatively to the main shaft, the main shaft and the output shaft being operatively connected to one another;
   a combustion engine, that selectively can be connected operatively to one of the component transmissions via the dual clutch and one of the component transmission input shafts to drive the output shaft via the main shaft;
   an electric machine that can be connected positively and operatively to either of the component transmission input shafts or to the output shaft, or that can be connected positively and operatively to one of the component transmission input shafts or to the main shaft; and
   an electric machine gearwheel pair with a clutch element for positive operative connection of the electric machine to a first of the component transmission input shafts or to the output shaft, and the drive system has a further electric machine gearwheel pair and a further clutch element for positive operative connection of the electric machine to the other component transmission input shaft or to the output shaft.

2. The drive system of claim 1, wherein the drive system has an electric machine gearwheel pair with a clutch element for positive operative connection of the electric machine to one of the component transmission input shafts or to the output shaft.

3. The drive system of claim 1, wherein the electric machine is configured to be decoupled from the drive system.

4. A drive system for a motor vehicle, comprising:
   a dual clutch transmission that has two component transmissions, a dual clutch and an output shaft, the two component transmissions comprising a common main shaft, each component transmission having one component transmission input shaft that can be connected operatively to the main shaft, the main shaft and the output shaft being operatively connected to one another;
   a combustion engine, that selectively can be connected operatively to one of the component transmissions via the dual clutch and one of the component transmission input shafts to drive the output shaft via the main shaft;
   an electric machine that can be connected positively and operatively to either of the component transmission input shafts or to the output shaft, or that can be connected positively and operatively to one of the component transmission input shafts or to the main shaft, the electric machine of the drive system can be connected positively and operatively via a gearwheel pair of one gear stage of one of the component transmissions to the corresponding component transmission input shaft or to the main shaft, the gearwheel pair of the gear stage on the corresponding component transmission input shaft and on the main shaft is a loose wheel pair that can be fixed positively on the component transmission input shaft and on the main shaft by a clutch element to drive the component transmission or the main shaft.

5. The drive system of claim 4, wherein the electric machine of the drive system is arranged to be connected positively and operatively to a gearwheel of the gearwheel pair that is arranged on the corresponding component transmission input shaft.

6. The drive system of claim 4, wherein the electric machine of the drive system is arranged to be connected positively and operatively to a gearwheel of the gearwheel pair that is arranged on the main shaft.

7. A drive system for a motor vehicle, comprising:
   a dual clutch transmission that has two component transmissions, a dual clutch and an output shaft, the two component transmissions having a common main shaft, each component transmissions having one component transmission input shaft that can be connected operatively to the main shaft, and the main shaft and the output shaft being operatively connected to one another;
   a combustion engine that selectively can be connected operatively to one of the component transmissions via the dual clutch and one of the component transmission input shafts to drive the output shaft via the main shaft; and
   an electric machine that is connected positively and operatively to one of the component transmission input shafts and can be connected nonpositively and operatively to the output shaft.

8. The drive system of claim 7, wherein the electric machine is connected rigidly to one of the component transmissions.

9. The drive system of claim 7, wherein the electric machine can be connected nonpositively and operatively to the output shaft by a clutch device.

* * * * *